United States Patent [19]

Hokuto et al.

[11] Patent Number: 5,734,140
[45] Date of Patent: Mar. 31, 1998

[54] GAS INSULATED HIGH VOLTAGE CIRCUIT BREAKER INCLUDING TULIP CONTACT ASSEMBLY AND INSERTION RESISTOR

[75] Inventors: Hiromichi Hokuto; Kunio Hirasawa; Masatomo Ohno; Manabu Takamoto; Hideo Kawamoto, all of Hitachi, Japan

[73] Assignee: Hitachi, Ltd., Tokyo, Japan

[21] Appl. No.: 506,627

[22] Filed: Jul. 25, 1995

[30] Foreign Application Priority Data

Sep. 29, 1994 [JP] Japan .................... 6-234765

[51] Int. Cl.⁶ ............... H01H 33/16; H01H 9/42; H02B 13/02
[52] U.S. Cl. ............................................ 218/143
[58] Field of Search ............ 218/43–88, 118, 218/119, 143, 144

[56] References Cited

U.S. PATENT DOCUMENTS

| | | | |
|---|---|---|---|
| 3,594,524 | 7/1971 | Heintz | 218/119 X |
| 4,069,406 | 1/1978 | Meinders | 218/143 |
| 4,207,446 | 6/1980 | Sasaki et al. | 218/143 |
| 4,293,749 | 10/1981 | Kishi et al. | 218/143 |
| 4,423,298 | 12/1983 | Tsukushi et al. | 218/143 |
| 4,439,651 | 3/1984 | Thuries et al. | 218/143 |
| 4,488,021 | 12/1984 | Yoshizumi | 218/143 |
| 4,500,762 | 2/1985 | Yoshizumi | 218/143 |
| 5,091,614 | 2/1992 | Yamamoto et al. | 218/143 |
| 5,235,147 | 8/1993 | Pham et al. | 218/143 |
| 5,245,145 | 9/1993 | Freeman et al. | 218/143 |
| 5,262,605 | 11/1993 | Pham et al. | 218/143 |

FOREIGN PATENT DOCUMENTS 1-89127  4/1989  Japan ................ H01H 33/70

Primary Examiner—J. R. Scott
Attorney, Agent, or Firm—Fay, Sharpe, Beall, Fagan, Minnich & McKee

[57] ABSTRACT

A circuit breaker includes a tank grounded and filled with an insulating gas, a first electrical series-connected section having a main conductor and a main breaking section, and a second electrical series-connected section having a resistor and an advance closing contact device. The first electrical series-connected section is coupled electrically in parallel to the second electrical series-connected section. The fixed contact side of the main breaking section is supported by an insulating cylinder and the fixed contact side of the advance closing contact device is supported by an insulating plate from the fixed contact side of the main breaking section. A breaking unit, chiefly composed of the main breaking section and the advance closing contact device, is supported by insulating cylinders. A resistor unit is supported by an insulating cylinder. The assembly of each of the units can be performed completely outside the tank, thereby eliminating the need for performing any adjustment type of work within the tank.

13 Claims, 4 Drawing Sheets

FIG. 5
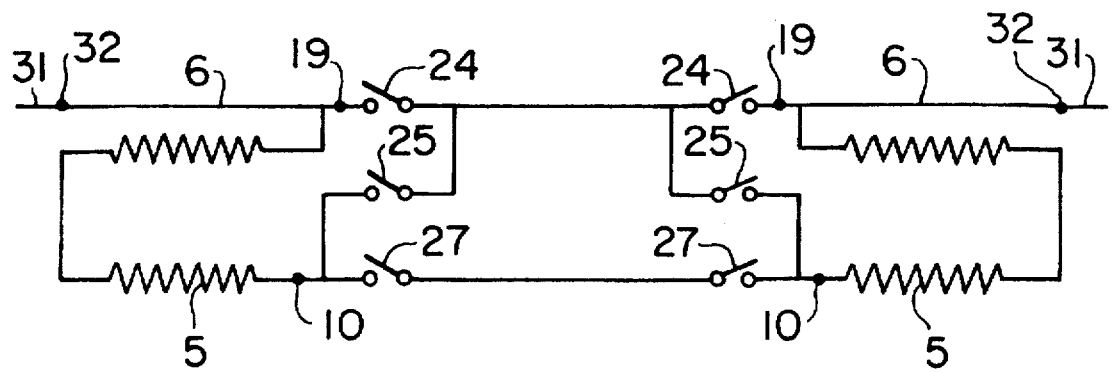
FIG. 6A
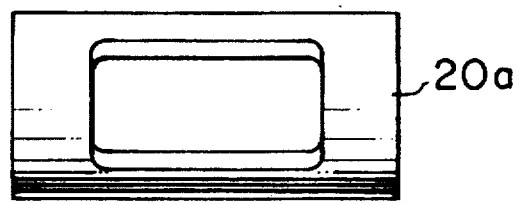
FIG. 6B
FIG. 6C
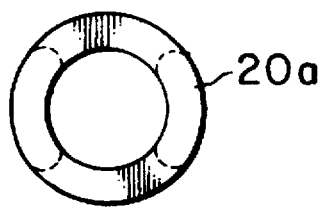
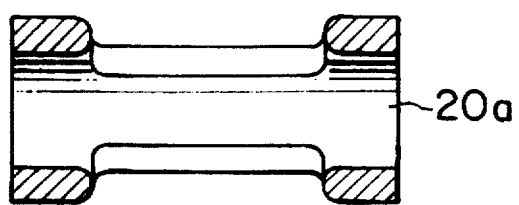
FIG. 7B
FIG. 7A
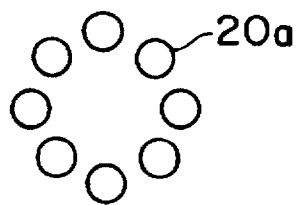
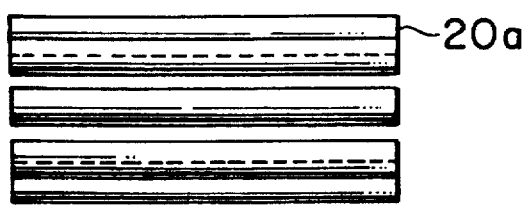

1

GAS INSULATED HIGH VOLTAGE CIRCUIT BREAKER INCLUDING TULIP CONTACT ASSEMBLY AND INSERTION RESISTOR

BACKGROUND OF THE INVENTION

1. Field of the Invention

The present invention relates to a grounded tank type resistor-equipped circuit breaker applicable to power stations or substations.

2. Description of the Prior Art

FIG. 8 illustrates a conventional technique disclosed in Japanese Unexamination Patent Publication No. 1-89127. The prior art breaker is housed in a tank grounded to have the earth potential and filled with an insulating gas. The breaker is further provided with a main conductor 6, a surge suppressing resistor 5, a main breaking section made up of components 2, 3, 11, 12, 12, 14 and others electrically coupled in series to the main conductor 6, and an advance closing contact device made up of components 4, 15 and others electrically coupled in series to the resistor 5. As shown in FIG. 9, which is a schematic illustration of a circuit corresponding to FIG. 8, a first electrical serial connection comprising the main conductor 6 and the main braking section 24 is electrically coupled in parallel to a second electrical serial connection comprising the resistor 5 and the advance closing contact device 25.

In order to take a closed state, the advance closing contact device is closed prior to the closing of the main breaking section to allow a closing current to flow through the resistor, thereby suppressing the occurrence of the surge. Thereafter, the main breaking section turns into a closed state, whereby normally the current chiefly flows through the main conductor. Further, in order to reduce the bending moment generated due to a heavy object, insulating supporting cylinders 9 do not support the components in a direction coincident with the tank longitudinal direction but are vertically disposed right under substantially the longitudinal central portion of the main conductor 6.

The foregoing prior art, however, has a problem in that since a main breaking section fixing side fixed arc contact 2, a main conducting contact 3 and so on are provided on the main conductor 6 and a fixed side contact 4 of the advance closing contact 25 and so on are placed on the resistor 5, the work for alignment between the contacts of the main braking section and between the contacts of the advance closing contact device and the stroke-direction dimension adjusting work are all required to be done within the tank. This increases the possibility that foreign matters undesirably occur in the insulating space.

In addition, the movable and fixed sides of the main braking section and the movable and fixed sides of the advance closing contact device are completely separately supported by different mechanical means. Thus, the modes of vibrations of the movable and fixed sides which take place due to external vibrations at transport and earthquake are different from each other, so that the mechanical stress tends to increase in and around the coupling portion between the movable side and the fixed side.

Moreover, in a case where the number of resistors becomes large, electric field shields 8d and 8e disposed at the resistor side cause a further increase in the size of the tank and in the weight load on the insulating supporting cylinders 9.

SUMMARY OF THE INVENTION

It is, therefore, an object of this invention to eliminate the above-mentioned problems.

2

For eliminating the above-mentioned problems, the following features of this invention are provided.

1) The arrangement within the tank is divided into two units; i.e., a breaking unit comprising a main breaking section including its fixed contact side and an advance closing contact device including its fixed contact side, and a resistor unit comprising a main conductor and a resistor.

With this unit division, the fixed contact side of the main breaking section and the fixed contact side of the advance closing contact device can previously be built in the breaking unit outside the tank, which eliminates the necessities for the alignment work and stroke-direction dimension adjusting work within the tank, thus reducing the probability of generation of foreign matters in the insulating space. In addition, since the assembly of each unit is all completed outside the tank, the assembling work is simplified to increase the efficiency, and working outside the tank suppresses the generation of the foreign matters.

2) Each unit is supported by an insulator, and all connecting sections of each unit are based on a tulip contact or the like which allows an electrically close and mechanically rough connection with no adjustment required.

This structure can absorb the external vibrations caused due to the transport and earthquake, thus avoiding the increase in the mechanical stress in the vicinity of the connecting sections between the movable sides and fixed sides of the main breaking section and the advance closing contact device. In addition, since the connections between the units within the tank can be accomplished by means of plug-in connections with no requirement for adjustment, the assembling work is simplified to increase the efficiency, and working outside the tank can suppress the generation of foreign matters.

3) The components of the resistor unit are also used as electric field shields, thus removing the shielding members from the resistor unit.

This structure can reduce the diameter of the tank irrespective of an increase in the number of the resistors being required and also reduce the weight load applied onto the insulator supporting the resistor unit.

These and other objects, features, and advantages of the invention will become more apparent from the following description with reference to the accompanying drawings.

BRIEF DESCRIPTION OF THE DRAWINGS

FIG. 5 schematically illustrates a circuit corresponding to the arrangement of FIG. 4;

FIGS. 6A to 6C show another embodiment of an inter-contact insulating cylinder for supporting a fixed contact side of a breaking section;

FIGS. 7A and 7B show a modification of the inter-contact insulating cylinder for supporting the fixed contact side of the breaking section;

DESCRIPTION OF THE PREFERRED EMBODIMENTS

Figure 1:
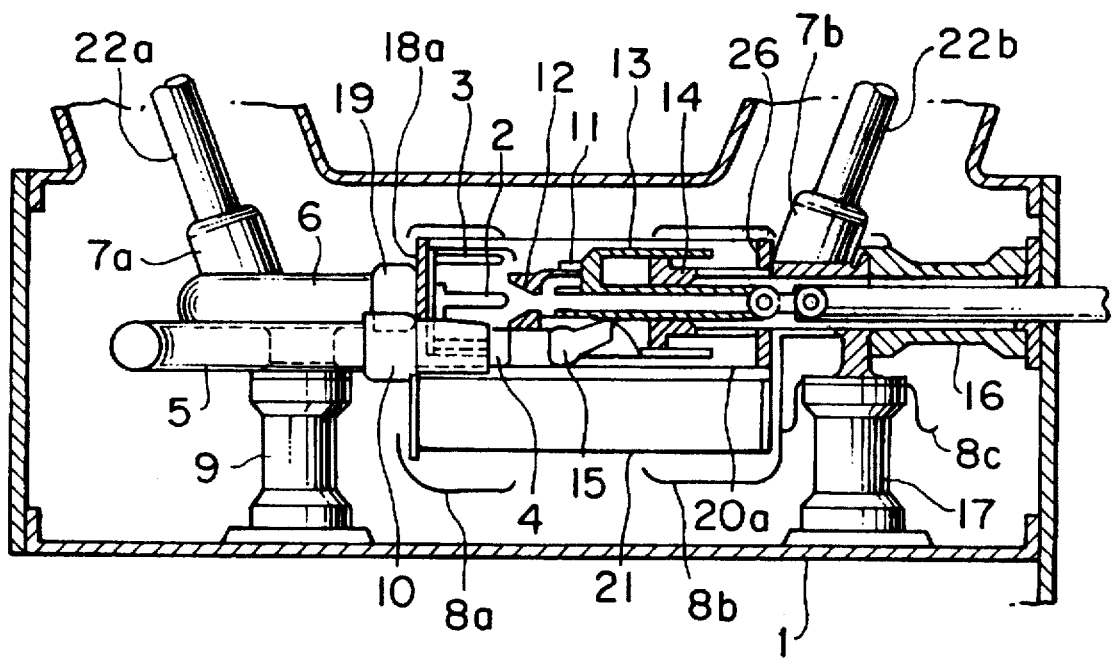
FIG. 1 is an illustration of an embodiment of the present invention.
Figure 2:
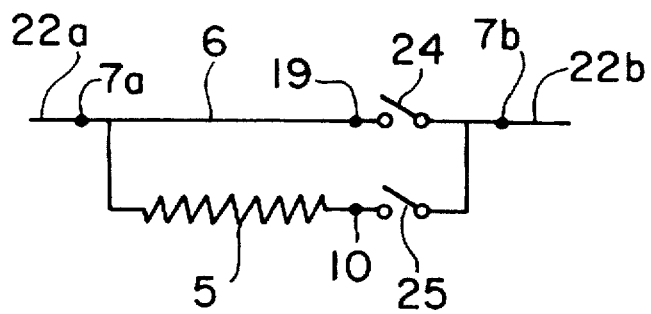
FIG. 2 schematically illustrates a circuit corresponding to the arrangement of FIG. 1.
Figure 3:
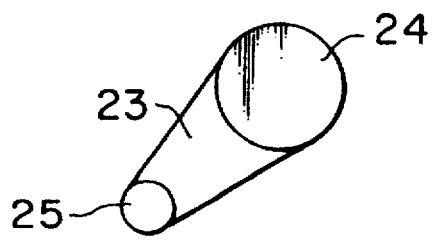
FIG. 3 shows the relationship between a fixed contact side of a main breaking section and a fixed contact side of an advance closing contact device.

Referring now to FIG. 1, a description will be made hereinbelow of an embodiment of the present invention. A tank 1 having a grounded potential is filled with an insulating gas and further provided with a main conductor 6, a making surge suppressing resistor 5, a main breaking section 24 made up of a fixed arc contact 2 electrically coupled in series to the main conductor 6, a main conducting contact 3, a movable arc contact 11, an insulating nozzle 12, a buffer cylinder 13, a fixed piston 14 and others, and an advance closing contact device 25 made up of an advance closing fixed contact 4 electrically coupled in series to the resistor 5, advance closing movable contact 15 fixedly secured to the buffer cylinder 13, and others. As shown in FIG. 2 which is a schematic illustration of a circuit corresponding to FIG. 1, a first electrical serial connection comprising the main conductor 6 and the main breaking section 24 is electrically coupled in parallel to a second electrical serial connection comprising the resistor 5 and the advance closing contact 25, thereby constituting a breaker. For taking a closed state, the advance closing contact device 25 is closed prior to the main breaking section 24 to allow a closing current to flow through the resistor 5, thereby suppressing the occurrence of a surge. Thereafter, the main breaking section 24 turns into a closed state, whereby the current chiefly flows through the main conductor 6 at normal time. The fixed contact side of the main breaking section 24 is supported through a plate 18a by means of an inter-contact insulating cylinder 20a fixedly secured to a bracket 26 fitted at the movable contact side thereof. As shown in FIG. 3, the fixed contact side of the main breaking section 24 supports, through an insulating plate 23, the fixed contact side of the advance closing contact device 25. In addition, for the purpose of moderating the initial rise rate of the transient voltage developed between the contacts of the main breaking section 24 at a short-line-fault, a parallel capacitor 21 may be provided, if required, between the contacts of the main breaking section 24 and supported by the plate 18a and the bracket 26. Thus, the breaking unit, chiefly composed of the main breaking section 24 including its fixed contact side and the advance closing contact device 25 including its fixed contact side, is supported through the insulating cylinders 16, 17, and the parallel capacitor 21 and shields 8a, 8b, 8c are placed if required. The breaking unit is connected through a tulip contact 7b to a central conductor 22b passing through a bushing, not shown, so as to be electrically coupled to an external terminal, and is further connected, through a tulip contact 10 between the resistor 5 and the advance closing contact device 25 and a tulip contact 19 between the main conductor 6 and the main breaking section 24, to the resistor unit which will be described later. On the other hand, the resistor unit, chiefly made up of the main conductor 6 and the resistor 5, is supported by the insulating cylinder 9 and connected to the foregoing breaking unit through the tulip contacts 10, 19, and is further connected through a tulip contact 7a to a central conductor 22a passing through a bushing, not shown, so as to be electrically coupled to an external terminal. In addition, the components of the resistor unit also act as electrical shields, thus removing the general shields.

With the division of the structure within the tank into the breaking unit and the resistor unit, the fixed contact side of the main breaking section and the fixed contact side of the advance closing contact device can be incorporated into the breaking unit beforehand, which eliminates the necessities for the alignment work and stroke-direction dimension adjusting work which have been done within the tank in the prior art, and further which reduces the possibility of the generation of undesirable foreign matters in the insulating space. In addition, each unit is completed outside the tank, which simplifies the assembling work and improves its efficiency as well as suppresses the generation of foreign matters because of no work carried out within the tank. Moreover, all the connecting sections in each unit are based on the tulip contacts which sufficiently absorb the external vibrations, and all the connections can be accomplished, with no adjustment, in a plug-in coupling manner. This simplifies the assembling work and improves its efficiency, as well as greatly reduces the possibility of the generation of foreign matters because of no work done within the tank. Furthermore, the resistor unit does not require extra shields because its components act as electric field shields, and further reduces the dimension of the tank irrespective of the increase in the number of resistors, and hence reduces the weight load applied onto the insulating cylinder supporting the resistor unit.

Figure 4:
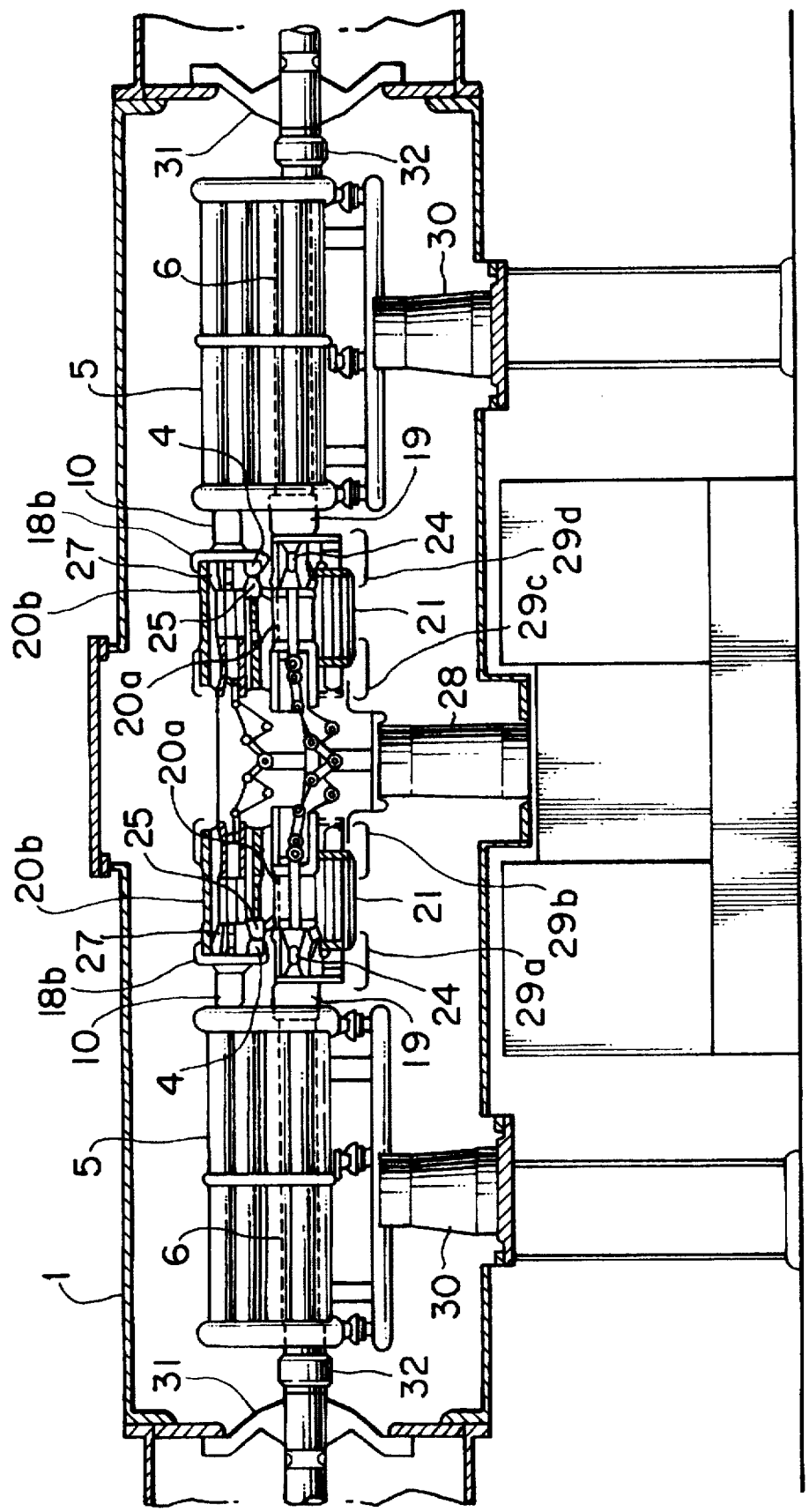
FIG. 4 is an illustration of another embodiment of this invention.
Figure 8:
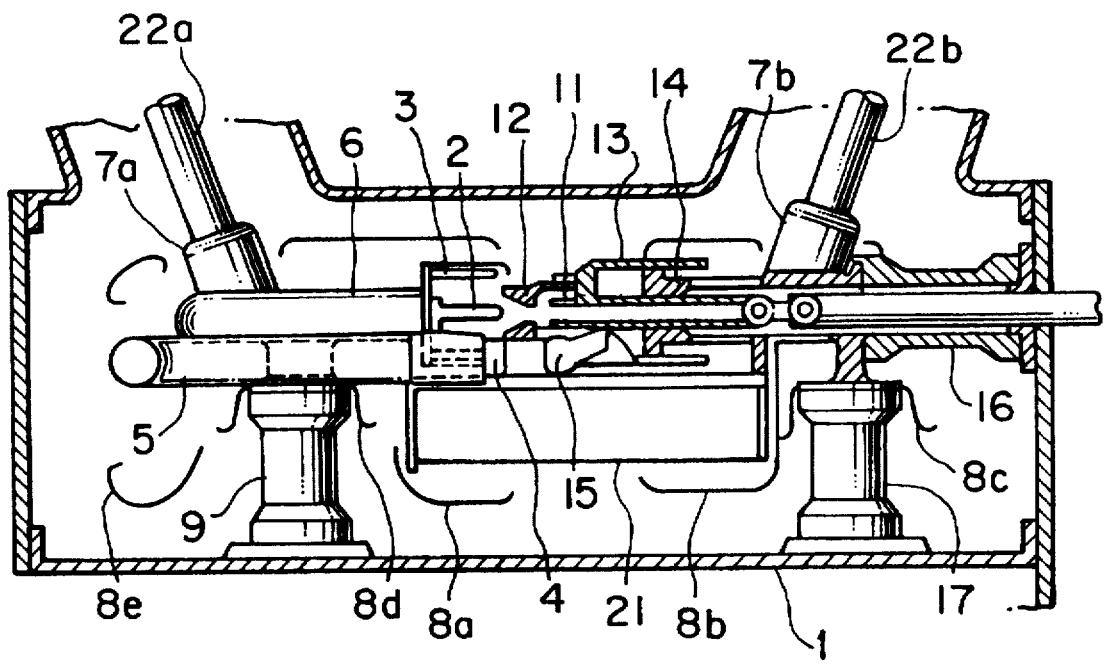
FIG. 8 is an illustration of the conventional breaker.
Figure 9:
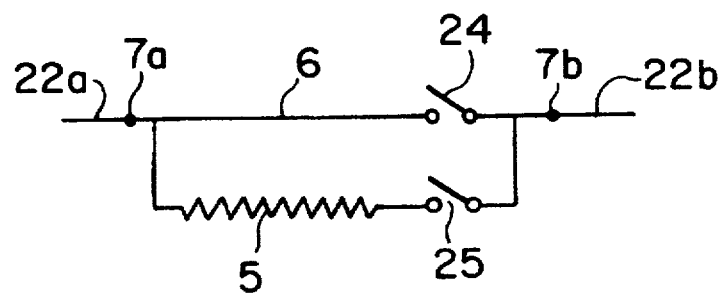
FIG. 9 schematically illustrates a circuit corresponding to the conventional breaker shown in FIG. 8.

FIG. 4 is an illustration of another embodiment of this invention. The basic difference from the FIG. 1 arrangement is that the other embodiment has three sections, which provides a breaking surge suppressing effect in addition to the closing surge suppressing effect. That is, the FIG. 4 arrangement additionally includes a resistance breaking section and hence has an increased number of necessary resistors. Other basic structure is the same as the FIG. 1 structure. In FIG. 5 schematically showing a circuit corresponding to the FIG. 4 arrangement, a breaker according to this embodiment is composed of an electrical serial connection A comprising a main conductor 6 and main breaking sections 24 and an electrical serial connection B comprising resistors 5, advance closing contact devices 25 and resistance breaking sections 27 (which are coupled electrically in parallel to the advance closing contact device 25), both connections A and B being coupled electrically in parallel to each other. In order to take a closed condition, the advance closing contact devices 25 are designed to be closed prior to the main breaking sections 24 and the resistance breaking sections 27 so that a closing current flows into the resistors 5, thus resulting in suppressing the closing surge. Subsequently, the main breaking sections 24 and the resistance breaking sections 27 turn into closed states so that a current chiefly flows through the main conductor 6 in normal time. When taking a broken state, after the opening operation of the main breaking sections 24 and the advance closing contact devices 25, the resistance breaking sections 27 are opened so that a breaking current flows through the resistors 5, thereby suppressing the breaking surge. As in the FIG. 1 embodiment, the main breaking sections 24 and the resistance breaking sections 27 both have their fixed contact sides supported by intercontact insulating cylinders 20a, 20b, respectively. On the other hand, the advance closing fixed contacts 4 are mounted on plates 18b provided at the fixed contact sides of the resistance breaking sections 27. The breaking unit, mainly composed of the main breaking sections 24 including fixed contact sides, the resistance breaking sections 27 including fixed contact sides and the advance closing contact devices 25 including fixed contact sides, is supported by an insulating cylinder 28, and if required, parallel capacitors 21 and shields 29a, 29b, 29c, 29d are added thereto. The breaking unit is connected to the resistor unit, which will be described later, through tulip contacts 10 between the resistors 5 and the advance closing contact devices 25, the resistance breaking sections 27 and tulip contacts 19 between the main conductor 6 and the main breaking sections 24. On the other hand, the resistor unit chiefly comprising the main conductor 6 and the resistors 5 is supported by insulating cylinders 30 and connected to the foregoing breaking unit through the tulip contacts 10, 19, and further connected through tulip contacts 32 to gas sealing spacers 31 at both ends of the tank 1. In addition, the components of the resistor unit also acts as electric field shields, which can remove extra shields therefrom.

The FIG. 4 embodiment can offer the same effect as the FIG. 1 embodiment. Further, in both the FIG. 1 and FIG. 4 embodiments, when the mechanical accuracies of the components including the main breaking sections 24, advance closing contact devices 25 and resistance breaking sections 27 are improved and a spigot joint structure are used therein, it is possible to omit the operation to align the contacts and the stroke-direction dimension adjusting work in assembling the breaking unit outside the tank.

In these embodiments, each unit is supported by an insulator and all the connections between the units are achieved by tulip contacts, so that external vibrations are sufficiently absorbable. In addition, the connections between the units within the tank can be accomplished, with no adjustment, by means of plug-in connections, so that the assembling work can become simple to improve its efficiency and, furthermore, the generation of foreign matters can sufficiently be lowered because of no work done within the tank. Moreover, since the components of the resistor unit also function as electric field shields, it is possible to eliminate extra shields, so that the size of the tank is reduced regardless of an increase in the number of resistors and the weight load applied to the insulator supporting the resistor unit.

Furthermore, the intercontact insulating cylinders 20a or 20b shown in FIGS. 1 and 4, provide an advantage in that discharge of the hot gas at breaking is facilitated, the replacement of parts is simplified and destructive products are reliably removed when the insulating cylinders are provided with openings as shown in FIGS. 6A and 6B. The advantages of the FIG. 6 design are also obtainable even if a plurality of insulators shown in FIG. 7 are used in place of a single intercontact insulating cylinder.

According to this invention, the alignment work and stroke-direction dimension adjusting work which have been done within the tank in the prior art become unnecessary and the probability of the generation of undesirable foreign matters in the insulating space becomes low. In addition, each of the individual units can all be completely assembled outside the tank, which simplifies the assembling work, improves its efficiency and sufficiently reduces the generation of foreign matters because no work is done within the tank.

What is claimed is:

1. A circuit breaker comprising:
    a tank that is grounded and contains an insulating gas;
    a conductor extending in one side of the tank;
    a breaking section including a fixed contact and a movable contact for allowing and breaking a current flow therethrough, and being arranged in another side of the tank,
    a first tulip contact connecting the breaking section to the conductor in the tank, and
    a second tulip contact in the tank and a resistor extending electrically parallel to the conductor in the tank, the breaking section including a main contact and a supplemental contact, the first tulip contact connects the main contact to the conductor in the tank, and the second tulip contact connects the supplemental contact to the resistor in the tank.

2. A circuit breaker according to claim 1, further comprising an insulating plate through which the main contact supports the supplemental contact as a unit.

3. A circuit breaker according to claim 1, further comprising an inter-contact insulating member, wherein the fixed contact is supported through the inter-contact insulating member relative to the movable contact as a unit.

4. A circuit breaker according to claim 3, wherein the inter-contact insulating member has a cylindrical shape.

5. A circuit breaker according to claim 1, wherein the conductor and the breaking section are supported by respective insulators in the tank.

6. A circuit breaker according to claim 1, wherein an inside of the tank is divided into a first unit including the conductor and a second unit including the breaking section.

7. A circuit breaker according to claim 6, wherein the first tulip contact is arranged between the first unit and the second unit.

8. A circuit breaker according to claim 1, wherein the resistor extending electrically parallel to the conductor in the tank is connected to the breaking section, the conductor and the resistor form a resistor unit, and the resistor unit includes an electric shield component.

9. A circuit breaker according to claim 1, wherein the resistor extending electrically parallel to the conductor in the tank is connected to the breaking section, the conductor and the resistor form a resistor unit, and the first tulip contact connects the breaking section to the resistor unit.

10. A circuit breaker according to claim 1, wherein the supplemental contact allows the current flow before the main contact allows the current flow.

11. A circuit breaker according to claim 1, wherein the main contact breaks the current flow before the supplemental contact breaks the current flow.

12. A circuit breaker according to claim 1, wherein the breaking section includes a fixed contact of the main contact and a movable contact of the main contact, and a fixed contact of the supplemental contact and a movable contact of the supplemental contact, the circuit breaker further comprises a first inter-contact insulating member and a second inter-contact insulating member, the fixed contact of the main contact is supported through the first inter-contact insulating member relative to the movable contact of the main contact as a unit, and the fixed contact of the supplemental contact is supported through the second inter-contact insulating member relative to the movable contact of the supplemental contact as a unit.

13. A circuit breaker comprising:
    a tank that is grounded and contains an insulating gas;
    a conductor extending in one side of the tank;
    a breaking section including a fixed contact and a movable contact for allowing and breaking a current flow therethrough, and being arranged in another side of the tank;
    a first tulip contact connecting the breaking section to the conductor in the tank; and
    an inter-contact insulating member, wherein the fixed contact is supported through the inter-contact insulating member relative to the movable contact as a unit, wherein the inter-contact insulating member has an opening for discharge of hot gas at breaking and for removal of destructive products.

* * * * *